Patented Feb. 9, 1932

1,844,571

UNITED STATES PATENT OFFICE

HANS GOLDSCHMIDT, DECEASED, LATE OF BERLIN-GRUNEWALD, GERMANY, BY MARIE ISOLINA GOLDSCHMIDT, NÉE WARING, ADMINISTRATRIX, OF BERLIN-GRUNEWALD, GERMANY, AND OSKAR NEUSS, OF BERLIN-CHARLOTTENBURG, GERMANY, ASSIGNORS, BY MESNE ASSIGNMENTS, TO SYNTHETIC PLASTICS COMPANY, INCORPORATED, OF NEW YORK, N. Y., A CORPORATION OF DELAWARE

ARTIFICIAL RESIN AND PROCESS OF MAKING THE SAME

No Drawing. Original application filed September 30, 1922, Serial No. 591,639, and in Germany November 19, 1921. Divided and this application filed June 25, 1931. Serial No. 546,915.

Our invention relates to improvements in bodies made from urea and formaldehyde, and also in the process for the manufacture of such bodies.

More particularly the invention relates to a process in which urea and formaldehyde are combined by heat into bodies which have a glass-like or an ivory-like appearance.

It is an object of this invention to provide a process which may be carried out economically and efficiently and within a comparatively short period of time. The invention further provides a process in accordance with which products may be obtained having properties which render them well adapted to various uses.

It is a further object of the invention to provide artificial resinous bodies prepared by interaction of urea and formaldehyde in the simultaneous presence of an inorganic acid and an organic body of acid character capable of forming a condensation product with formaldehyde and a process for the production of such bodies.

With these objects in view, our invention consists in condensing urea and formaldehyde together in the presence of an inorganic acid medium, as sulphuric acid and of an organic body of acid character which is itself capable of forming condensation products with formaldehyde, such as a phenol, and the like.

This application is a division of our copending application Serial No. 591,639, filed September 30, 1922, for process for making resins, in which the use of acid in making urea-formaldehyde condensation products is claimed broadly. This application also corresponds to our application for German Letters Patent filed November 19, 1921.

We have previously found, as set forth in our applications for German Letters Patent filed June 1, 1921, and August 26, 1921, that through the use of acid condensing media the cost of the process may be reduced, inasmuch as the amount of formaldehyde required may be reduced. The condensing media which we thus used consisted of small amounts of inorganic acids or of organic substances of an acid nature, as a phenol. These procedures give products having desirable properties, which properties we have found, by the present invention, may be materially improved if the condensation between the urea and formaldehyde is carried out using as condensing media an organic body of acid character, such as phenols, together with an inorganic acid. The condensation accordingly is effected in the simultaneous presence of an inorganic acid and an organic compound of acid character which is capable of forming a condensation product with formaldehyde.

The products obtained give off their water readily, either by evaporation or under pressure, whether the water be that of the raw materials or that arising as a result of the reaction. The character of the products will depend in a measure upon the quantities of the acid condensing media used, viz. if larger amounts of phenol are used in the presence of an inorganic acid, the products obtained are such that the water may be readily removed therefrom, as by mechanically squeezing, in the manner of removing water from a sponge. The artificial resinous bodies obtained by solidification under pressure of the product, closely resemble ivory with respect to hardness, ability to take a polish, ease of working, etc.

As illustrative embodiment of a manner in which the invention may be carried out in practice, the following example is presented:

10 grams of phenol are admixed with 94 grams of 30 per cent. formaldehyde and 0.096 gram of concentrated sulphuric acid. The admixture is heated to boiling, whereupon 20 grams of urea are added and heating continued until the reaction mass becomes syrupy. There results a cloudy, compact mixture from which after cooling the water may be removed by pressure. After hardening and final drying, and without the material changing its form, a compact body resembling ivory is obtained which is well adapted for working. The final product is entirely water-proof and it does not soften or swell in any way even when immersed in water for a long time.

Having described our invention, what we claim as new and desire to secure by Letters Patent, is:

1. The herein described process of producing artificial resinous bodies which comprises heating formaldehyde and urea in the presence of an inorganic acid and a phenol, as condensing media.

2. A process for the production of a condensation product which comprises reacting upon urea with formaldehyde in the presence of an inorganic acid and of a phenol.

3. A process for the production of a condensation product which comprises mixing a solution of formaldehyde with an inorganic acid and a phenol, heating the mixture to boiling, adding urea thereto and then heating to an extent such that upon cooling the reaction mass becomes solid.

4. A process for the production of a condensation product which comprises mixing a solution of formaldehyde with a small percentage of an inorganic acid and a phenol, heating the mixture to boiling, adding urea thereto and then heating to such an extent that upon cooling the mixture becomes solid.

5. The herein described process for the production of artificial resinous bodies which consists in mixing 10 grams of phenol, 94 grams of formaldehyde having a strength of 30 per cent. and 0.096 grams of concentrated sulphuric acid, heating the mixture thus formed to boiling, then adding 20 grams of urea and continuing the heating until the mixture becomes of a syrupy consistency.

6. As a new product an acidified reaction product of urea, formaldehyde and phenol produced by reacting upon urea with formaldehyde in the presence of an inorganic acid and of phenol, such product readily giving off its water either by evaporation or under pressure and yielding upon solidification under pressure a compact body resembling ivory with respect to hardness, ability to take a polish, ease of working and which is waterproof and does not soften or swell when immersed in water.

7. As a new product an urea-formaldehyde-phenol condensation product which in one stage of its production was prepared by heating urea, formaldehyde and a phenol in the presence of an inorganic acid such product by solidification under pressure being a compact body resembling ivory with respect to hardness, ability to take a polish and ease of working and which is waterproof and does not soften or swell when immersed in water.

OSKAR NEUSS.
MARIE ISOLINA GOLDSCHMIDT (née WARING),
*Administratrix of the Estate of Hans Goldschmidt, Deceased.*